Figure 1:
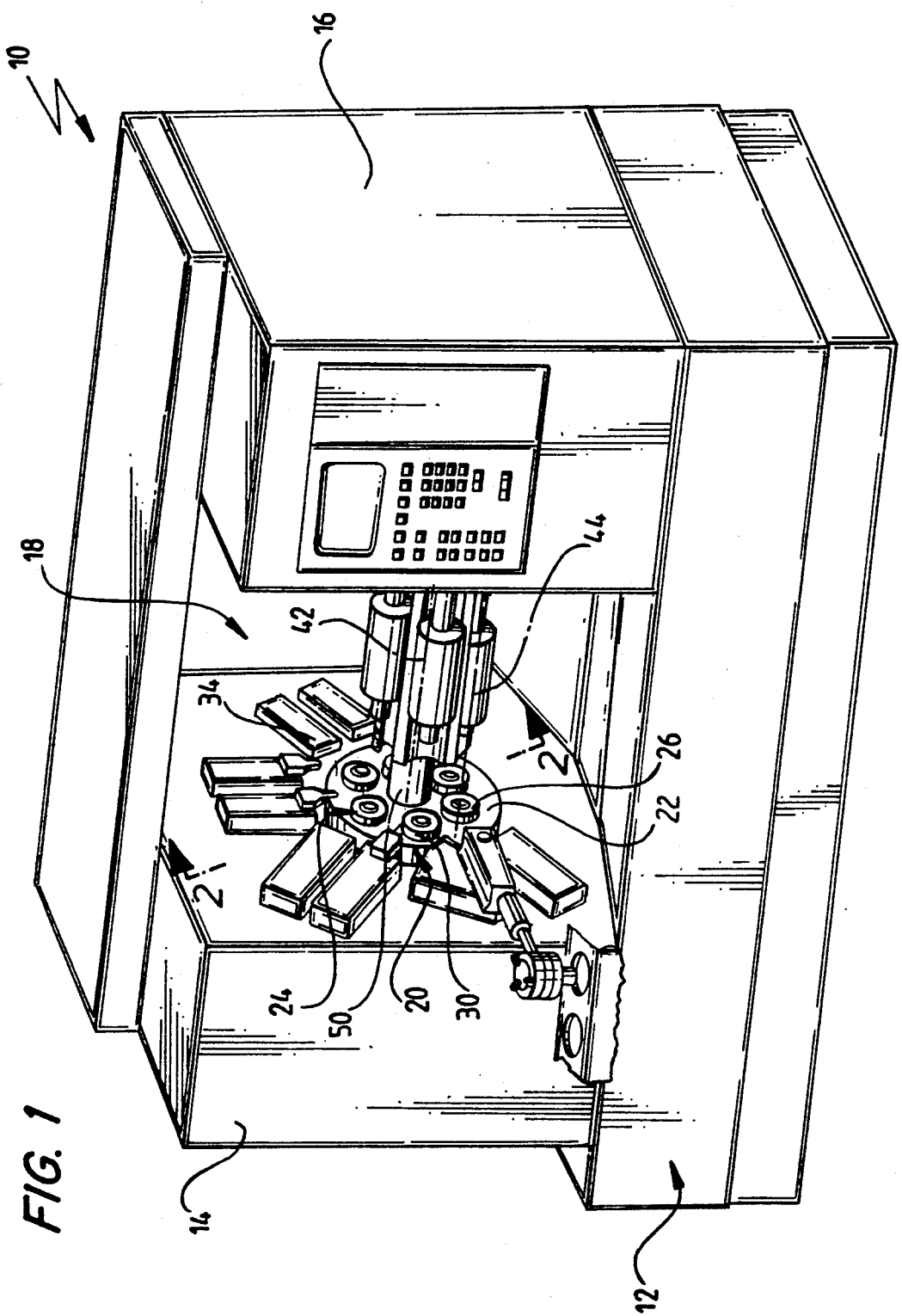

United States Patent [19]

Trautmann et al.

[11] Patent Number: 5,062,330

[45] Date of Patent: Nov. 5, 1991

[54] MACHINE TOOL WITH A COOLED MOTOR SPINDLE

[75] Inventors: Guenther H. Trautmann, Kirchheim-Nabern; Helmut F. Link, Aichwald 1, both of Fed. Rep. of Germany

[73] Assignee: Index-Werke Komm.-Ges. Hahn & Tessky, Fed. Rep. of Germany

[21] Appl. No.: 457,258

[22] Filed: Dec. 27, 1989

[30] Foreign Application Priority Data

Dec. 30, 1988 [DE] Fed. Rep. of Germany ....... 3844337

[51] Int. Cl.⁵ .............................................. B23B 19/02
[52] U.S. Cl. ......................................... 82/147; 82/129; 310/52; 310/58; 310/62; 310/88; 310/90; 310/112; 310/114; 310/254
[58] Field of Search ....................... 310/52, 64, 88, 55, 310/65, 90, 60 R, 60 A, 58, 59, 53, 62, 216, 112, 114, 254, 48, 66; 82/129, 147; 384/317, 321

[56] References Cited

U.S. PATENT DOCUMENTS

| 2,379,147 | 6/1945 | Groene | 82/129 |
|---|---|---|---|
| 3,508,093 | 4/1970 | Obukhov | 310/165 |
| 4,514,652 | 4/1985 | Olson | 310/90 |
| 4,665,781 | 5/1987 | Eichenhofer | 82/129 |
| 4,806,810 | 2/1989 | Hernden | 310/90 |
| 4,845,394 | 7/1989 | Kleinhaus | 310/64 |

FOREIGN PATENT DOCUMENTS

| 0084271 | 7/1983 | European Pat. Off. . | |
|---|---|---|---|
| 0094680 | 11/1983 | European Pat. Off. . | |
| 0583022 | 8/1933 | Fed. Rep. of Germany | 384/317 |
| 2928027 | 1/1981 | Fed. Rep. of Germany | 310/65 |
| 664532 | 5/1932 | Fed. Rep. of Germany . | |
| 1987794 | 2/1968 | Fed. Rep. of Germany . | |
| 2711238 | 12/1980 | Fed. Rep. of Germany . | |
| 3007917 | 9/1981 | Fed. Rep. of Germany . | |
| 3428861 | 2/1985 | Fed. Rep. of Germany . | |
| 8806657 | 8/1988 | Fed. Rep. of Germany . | |
| 2312875 | 12/1976 | France . | |
| 0616458 | 7/1978 | U.S.S.R. | 384/317 |
| 8908533 | 9/1989 | World Int. Prop. O. | 82/129 |

*Primary Examiner*—R. Skudy
*Attorney, Agent, or Firm*—Barry R. Lipsitz

[57] ABSTRACT

In order to improve a machine tool with a motor spindle, including a main motor integrated into a work spindle coaxially with the spindle axis, the main motor, for its part, comprising a rotor and a stator, and with a cooling device for supplying cooling surfaces of the main motor with a gaseous coolant, so that simple and effective cooling of the main motors of the motor spindles is possible, it is proposed that the stator be comprised of stator plates which, for their part, form cooling surfaces, and that the gaseous coolant be conducted directly along the cooling surfaces of the stator plates.

20 Claims, 3 Drawing Sheets

MACHINE TOOL WITH A COOLED MOTOR SPINDLE

The invention relates to a machine tool with a motor spindle, including a main motor integrated into a work spindle coaxially with the spindle axis, the main motor, for its part, comprising a rotor and a stator, and with a cooling device for supplying cooling surfaces of the main motor with a gaseous coolant.

In machine tools with motor spindles, it is, in particular, adjustable, asynchronous three-phase current motors that are used as main motors, as these can be subjected to very high loads and their output is constant over a wide range of adjustment. With these motor spindles, stabilization of the temperature of the main motor is particularly critical because the main motor itself is a component of a highly precise work spindle and so strong fluctuations in temperature would cause inaccuracies due to deformation of the spindle housing. Therefore, adequate separate cooling must be ensured for all motor spindles so that independently of the operating point of the motor the dissipation heat is always conducted away and the motor temperature kept below desired limits.

In the known machine tools, the three-phase current motors are only cooled in the circumferential surface region of their housing by a current of air being conducted over the housing in the axial direction. The stator heat is removed by heat conduction to the housing. To increase the cooling effect, the cooling surfaces of the housing are enlarged by, for example, fins or a double jacket. This type of cooling is, however, insufficient for precise motor spindles.

Liquid cooling is the only possibility of sufficiently cooling such motors, but this involves high apparatus expenditure and, more particularly, practically insurmountable problems with the supplying and removing of the cooling liquid.

The object underlying the invention is, therefore, to so improve a machine tool of the generic kind that simple and effective cooling of the main motors of the motor spindles is possible.

This object is accomplished in accordance with the invention in a machine tool with a motor spindle of the kind described at the beginning in that the stator is comprised of stator plates which, for their part, form cooling surfaces, and in that the gaseous coolant is conducted directly along the cooling surfaces of the the stator plates.

Hence the gist of the present invention is to be seen in the fact that the stator plates themselves form the cooling surfaces and a much more effective cooling of the main motor is thereby possible than in all the cases where heat is additionally conveyed from the stator to additionally provided cooling fins of a cooling jacket.

In particular, in order to enlarge the cooling surfaces, it has proven highly expedient for the stator plates to extend to an unequal extent in the radial direction and to thereby form cooling surfaces. The stator plates themselves can, for example, be given any shape which causes enlargement of the cooling surfaces which can be produced by channels within the entirety of the stator plates or by surfaces formed by the stator plates.

The solution according to the invention can be achieved in a particularly simple manner by different stator plates extending to a different extent in the radial direction.

In the embodiments described so far it was not specified where the cooling surfaces are to be located on the stator. As mentioned above, the cooling surfaces could also be formed by channels within the entirety of the stator plates. However, cooling can be achieved in a particularly simple way by the stator plates forming cooling surfaces which protrude on an outer side of the stator facing away from the motor.

The simplest possibility of producing such cooling surfaces is for the stator plates to form cooling fins which extend radially in relation to the spindle axis.

These cooling fins can be formed very simply by successive stator plates extending to a different extent in the radial direction, i.e. by the stator plates exhibiting in succession either a larger or a smaller radial extent and hence enlarging the cooling surface on the outer side of the stator. It is, for example, conceivable for the stator plates to alternately exhibit a different diameter so a stator plate of large diameter follows a stator plate of small diameter.

However, in order to impart significant stability to the cooling fins and to also create sufficiently large spacings between the cooling fins, to prevent the space between the cooling fins from becoming clogged with dirt and to ensure sufficiently good flow conditions, it is advantageous for the cooling fins to be formed by successive stator plates forming sets which extend to a different radial extent relative to one another. This means that several stator plates jointly exhibiting the same radial extent form a set which is followed by a set of stator plates exhibiting a different radial extent.

Hence the individual sets of stator plates can form many different cooling fin configurations. More particularly, any conceivable orientation of cooling fins relative to the spindle axis is possible.

Within the scope of the present invention, it is, however, particularly simple if the cooling fins extend in planes extending transversely to the spindle axis as it is, for example, then possible for identical sets of stator plates with alternating diameter to be arranged in succession. In the embodiments described so far it was not indicated whether the cooling fins are to be merely short pieces or are to extend over longer regions on the outer side of the stator. In particular, when a compact motor spindle design is required, it is expedient for cooling channels which extend at least partly around the stator to lie between the cooling fins so the gaseous coolant does not have to flow towards the stator from all sides thereof, but it is adequate for the stator to be acted upon at certain points by the gaseous coolant which can then circulate in the cooling channels extending partly around the stator and cool them. The cooling channels may extend in all possible directions. It is, for example, conceivable for the cooling channels to wind in helical or zig-zag configuration around the stator. It is, however, particularly expedient for the cooling channels to lie in planes extending transversely to the spindle axis, as a stream of coolant for cooling the stator can then flow transversely towards the stator, which has proved extremely beneficial in use of the motor spindle in machine tools.

In a particularly preferred embodiment of the inventive machine tool, the cooling device is designed such that the pressure of the coolant in the main motor is above atmospheric. This has the advantage that the main motor as a whole is protected against dirt and, for example, also cooling liquid mist or cooling liquid itself entering it. In the inventive machine tool, it is particularly advantageous for a spindle bearing which faces a working area to be acted upon by the coolant under pressure above atmospheric. This spindle bearing is the more susceptible bearing of the motor spindle because owing to the fact that it essentially lies close to the working area, it is highly exposed to the entrance of cooling liquid mist or cooling liquid itself or other dirt particles and can, therefore, easily corrode or become damaged in some other way. For this reason, it is particularly advantageous for this spindle bearing to be protected by being constantly acted upon by the coolant under pressure above atmospheric which counteracts penetration of dirt and cooling liquid.

It is optimal for the spindle with its spindle bearings to be acted upon by the coolant under pressure above atmospheric so that the coolant under pressure above atmospheric counteracts the penetration of dirt and liquid in the case of both spindle bearings and there is also an additional regulation of the temperature of the spindle itself.

In particular, for regulating the temperature of the coolant, it is highly advantageous in all of the embodiments mentioned hereinabove for the cooling device to comprise a cooler for the coolant which is fed to the main motor so that this coolant can be precooled to the desired temperature before it enters the respective main motor or the respective main motors and, therefore, on the one hand, the cooling surfaces of the main motors can be kept smaller, which, in turn, offers the advantage of a more compact structural design for the main motor installed in the machine tool and hence great advantages from a structural point of view, in particular, in machine tools with several main motors in a spindle drum.

It is, furthermore, advantageous for the cooling device to comprise a fan in order to obtain a forced current of air. The fan is advantageously mounted in the machine frame so that it can be arranged and operated separately from the main motors and temperature regulation can, therefore, be carried out independently of the rotational speed of the main motors.

The special advantages of the invention become more apparent when several motor spindles are arranged in a spindle drum which, for its part, is mounted for rotation in a machine frame. In this case, the advantages of the invention become particularly clear, as cooling of several, for example, 6 or 8 motor spindles in the spindle drum is very difficult owing to the confined space conditions.

In this embodiment, it has proven particularly expedient for the cooling fins to form cooling channels extending in the radial direction of the spindle drum, as the gaseous coolant can then flow in the radial direction in relation to the axis of the spindle drum, which is particularly beneficial if impairment of front and rear sides of the spindles by means for conducting the gaseous coolant is avoided.

In a particularly preferred embodiment, provision is made for the cooling device to have a channel leading to an outer circumferential side of the spindle drum and a central channel surrounded by the main motors and for the channels to, on the one hand, feed the gaseous coolant to the spindle drum and, on the other hand, conduct it away from it.

All of the main motors can be cooled jointly in a particularly simple way by the channel leading to the outer circumferential side of the spindle drum enclosing the outer circumferential side of the latter and hence supplying all of the main motors with coolant.

It is, furthermore, also advantageous for the central channel to extend in the direction of the axis of the spindle drum.

Since attainment of sufficient stability of the spindle drum is an inherent problem in all embodiments of the inventive machine tool with several motor spindles in the spindle drum, it has, furthermore, proven expedient for for the cooling fins to simultaneously serve to support the stators in the spindle drums so in this respect, too, there is no necessity for extensive, additional measures while, at the same time, good stability of the entire construction is achievable.

In a preferred embodiment, the stators of the main motors of the motor spindles lie with their cooling fins contiguous with one another in regions thereof and thereby already support one another and so there are substantially improved possibilities for anchoring the stators in the spindle drum.

In this case, it is particularly expedient for the cooling fins to comprise in regions thereof a radial delimiting surface of circle segments of corresponding outer contour, with the size of the circle segment being determined by the number of spindles, i.e., either 1/6 or ⅛ circle segment in the case of 6 and 8 motor spindles, respectively.

Furthermore, in an advantageous embodiment, the cooling fins are supported on supporting bars of a cage serving as a spindle drum frame.

An embodiment of the inventive solution can be implemented in a particularly advantageous way from a structural point of view when the work spindle carries the rotor and thus, in particular, supports the latter for rotation relative to the stator, but a very efficient temperature regulation of the main motor is then necessary for the reasons given at the beginning.

Figure 2:
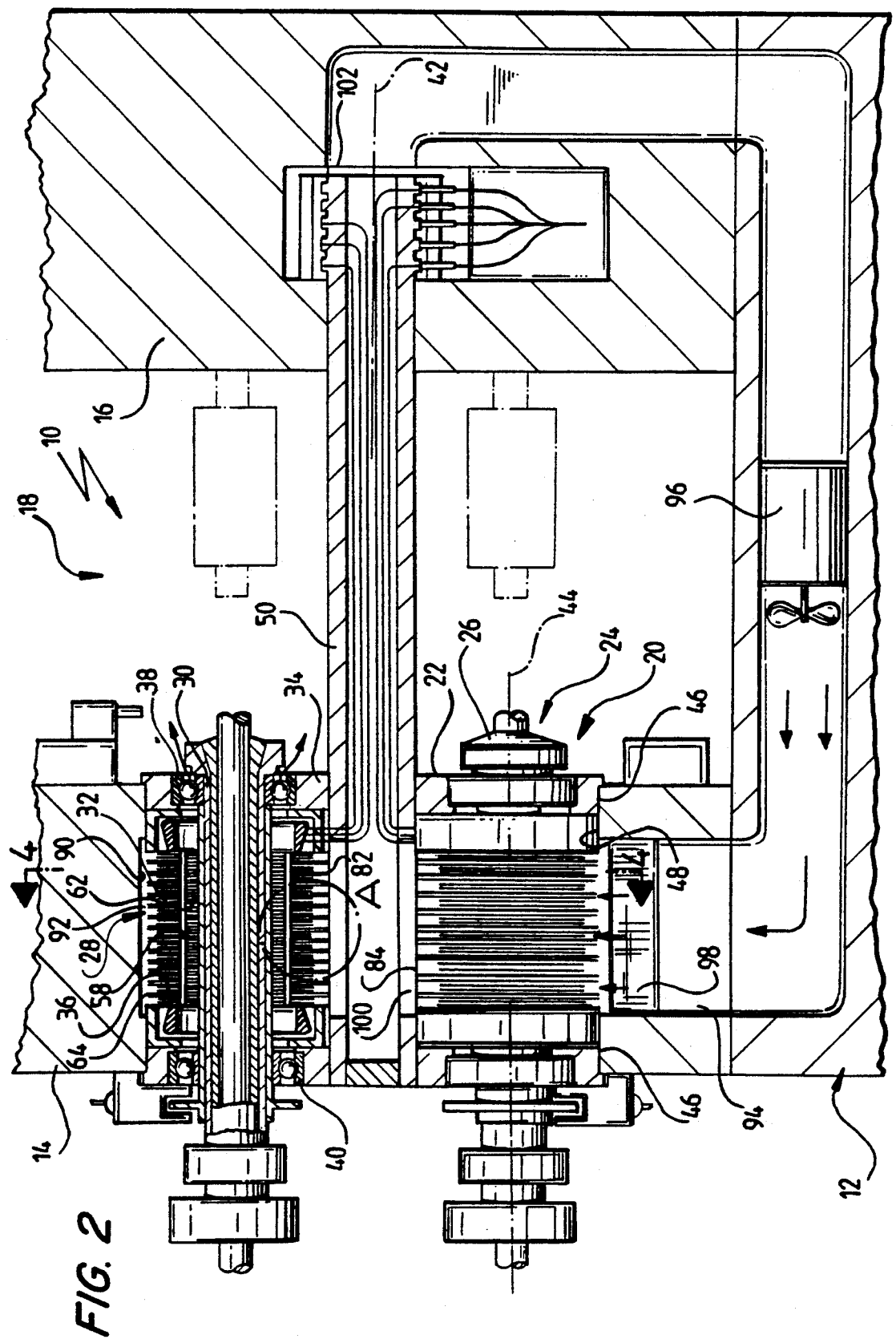
Figure 3:
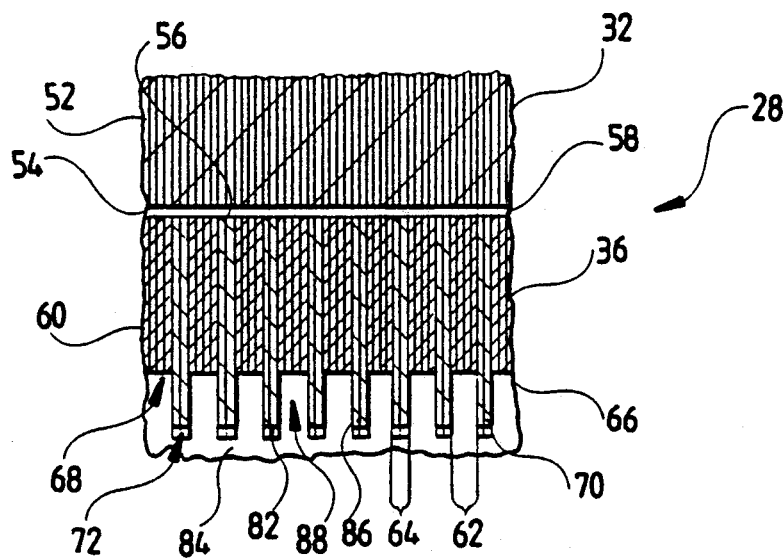

Further features and advantages of the present invention are to be found in the following description and the appended drawings of an embodiment. The drawings show:

FIG. 1 a perspective general view of a multiple-spindle as an example of a machine tool according to the invention;

FIG. 2 a section along line 2—2 in FIG. 1;

FIG. 3 an enlarged, detail illustration of area A in FIG. 2; and

Figure 4:
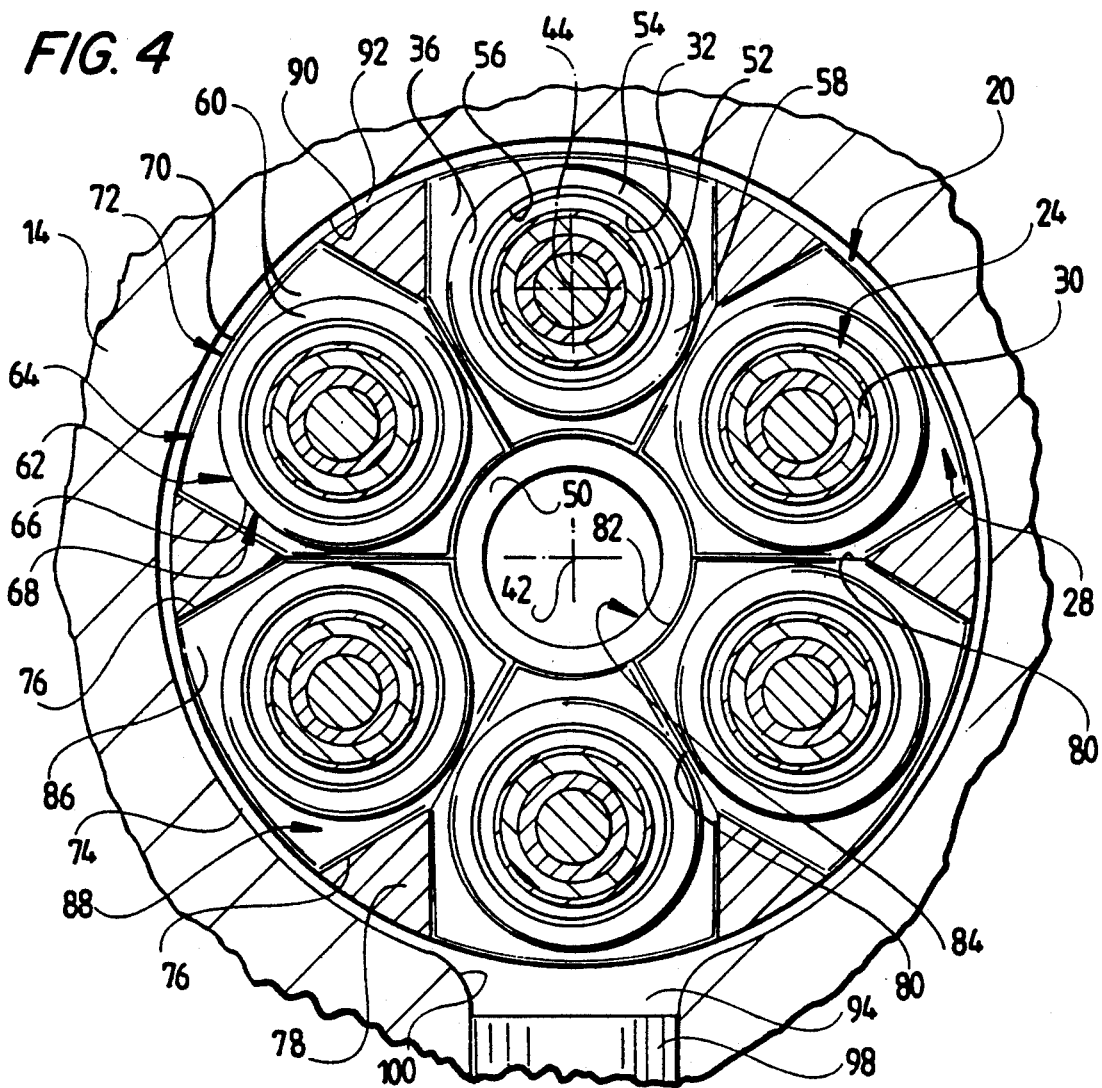

FIG. 4 a section along line 4—4 in FIG. 2.

A multiple-spindle automatic lathe designated in its entirety 10 in FIG. 1 as an example of a machine tool according to the invention comprises a frame designated in its entirety 12 with a spindle housing 14 and a control system housing 16, between which a working area designated in its entirety 18 is located. A spindle drum designated in its entirety 20 is arranged in the spindle housing 14 and faces the working area 18 with a front end face 22. The spindle drum 20 comprises several, preferably 6 or 8, spindles 24 which protrude with their front faces 26 beyond the front end face 22 and face the working area 18.

As may be seen, in particular, from FIG. 2, these spindles 24 are designed as motor spindles, i.e., there is integrated into the spindle 24 a main motor 28 which comprises a rotor 32 which is firmly seated on a spindle tube 30 and rotates with the latter and a stator 36 which is firmly seated in a frame 34 of the spindle drum 20.

The spindle tube 30 is held by a front bearing 38 and a rear bearing 40 in the frame 34 of the spindle drum 20.

The frame 34 is, in turn, rotatable about an axis 42 of the spindle drum 20 which, for its part, extends parallel to the spindle axes 44 of the spindles 24. The rotatable mounting of the frame 34 is implemented by means of cylinder circumferential surfaces 46 of the spindle drum 20 which are coaxial with the axis 42 and are supported in recesses 48 of the spindle housing 14 which are coaxial with the axis 42.

A supply pipe 50 which is coaxial with the axis 42 is held on the frame 34 for joint rotation therewith. The supply pipe 50 protrudes beyond the end face 22 of the spindle drum 20 and extends through the working area 18 as far as into the control system housing 16. All supply and control lines for the main motors 28 such as, for example, current supply lines run via this supply pipe 50.

As may be seen in FIG. 3, the rotor 32 is comprised of a plurality of rotor plates 52 arranged one behind the other. A small air gap 58 remains between an outer circumference 54 of the rotor 32 and an inner surface 56 of the stator 36 facing it. The stator 36 is similarly comprised of a plurality of stator plates 60 arranged one behind the other in the direction of the spindle axis 44. The stator plates 60 are oriented approximately at a right angle to the spindle axis 44 and extend around the rotor 32.

In order to achieve optimal cooling of the stator 36 in an inventive manner, stator plates 60 located one behind the other are combined into first sets 62 and second sets 64 which follow one another and alternate with one another in the direction of the spindle axis 44.

The first set 62 comprises stator plates 60 which extend from the inside surface 56 of the stator 36 in the radial direction in relation to the spindle axis 44 and with their outer edges 66 jointly form a cylindrical outer surface 68 coaxial with the spindle axis 44.

The second sets 64 similarly extend radially from the inside surface 56 of the stator 36, but beyond the outer surfaces 68 of the first sets 62 and form with their respective outer edges 70 an outer contour 72 which is adapted to the special dimensions of the spindle drum 20. As can be seen, for example, in FIG. 4, this outer contour 72 adapts with a circumferential portion 74 located radially outwardly in relation to the axis 42 of the spindle drum 20 to the cylinder circumferential surfaces 46 so that the outer contour 72 of the second sets 64 does not protrude beyond the spindle drum 20. Adjoining the circumferential portion 74 on both sides thereof are supporting regions 76 of the outer contour 72 with which the second sets 64 rest against support bars 78 of the frame 34 (FIG. 2) which are of generally triangular -shape and extend parallel to the axis 42. These support bars 78 each lie between two main motors 28 and altogether form a cage which carries the main motors 28 in a region of a periphery of the spindle drum 20. Adjoining the supporting regions 76, the outer contour 72 extends with radial regions 80 radially inwardly in relation to the axis 42 as far as an edge region 82 which joins the two radial regions 80 of the outer contour 72 and, for its part, delimits a central channel 84. The edge region 82 is preferably designed as a segment of a circumferential surface of a cylinder which is coaxial with the axis 42.

With the radial regions 80, the second sets 64 of adjacent main motors rest against one another and, therefore, mutually support one another.

As may be seen in FIG. 4, the outer contours 72 of the second sets 64 of stator plates 60, therefore, serve, on the one hand, to support the stators 36 of the individual main motors on the cage formed by the supporting bars 78 on the frame 34 of the spindle drum 20 and, on the other hand, to support one another mutually in the radial regions 80 so the total six stators 36 shown by way of example in FIG. 4 form a compact and stable unit within the spindle drum 20.

In addition, owing to the fact that the second sets 64 always protrude radially beyond the outer surfaces 68 of the first sets 62 there is created by the protruding regions of the second sets of stator plates 60 a plurality of cooling fins 86 which, for their part, form a plurality of cooling channels 88 which lie between the cooling fins 86 and are delimited by the outer surface 68 of the first sets 62. The cooling channels 88 extend from the circumferential region 74 radially inwardly in relation to the axis 42 to the central channel 84 in planes standing perpendicularly to the axis 42 around the outer surfaces 68 of the first sets 62 and hence likewise around the entire rotor 32 enclosed by the stator 36.

As may be seen, in particular, from FIG. 2, the spindle housing 14 with its portion 90 engaging over the circumferential regions 74 is set back with respect to the circumferential regions 74 of the outer contours 72 of the second sets 64 so as to produce between the circumferential regions 74 and the portions 90 a gap 92 which extends around the spindle drum 20. This gap 92 opens into an air inlet channel 94 which leads from a fan assembly 96 arranged in a bottom region of the frame 12 from below into the spindle housing 14. Immediately before the transition between the air inlet channel 94 and the gap 92, a cooler 98 for the air conducted from the fan assembly 96 is provided therein so that the air blown into the gap 92 can be cooled. This cooled air then flows in the gap 92 around the spindle drum 20 and is conducted in the cooling channels 88 radially inwardly in relation to the axis 42 of the spindle drum 20 to the central channel 84 from which it—as shown in FIG. 2—can enter the supply pipe 50 through an opening 100 therein and is conducted away along the supply pipe 50 in the direction of the control system housing 16. The air is preferably collected at an end 102 of the supply pipe 50 located in the control system housing 16 and fed to the fan assembly 96 so that, in all, there is a circuit for cooling air in which the stators 36 of all main motors 28 are effectively cooled.

Cooling of the main motors 28 in accordance with the invention is preferably carried out with the gaseous coolant at a pressure above atmospheric so that a pressure above atmospheric prevails in each spindle 24 to advantageously counteract penetration of dirt and cooling liquid into the bearings 38, 40, in particular into the front bearing 38 facing the working area 18.

What is claimed is:

1. A machine tool comprising:
   a motor spindle having a work spindle and a main motor, said main motor being integrated into and carried by said work spindle coaxially with a spindle axis thereof, said work spindle being mounted in at least two bearings, one of said bearings comprising a spindle bearing facing a working area of said machine tool, said main motor having a rotor and a stator, said stator having stator plates forming, for their part, cooling surfaces; and
   a cooling device designed to supply a gaseous coolant to said main motor under pressure above atmospheric, said gaseous coolant being conducted directly along said cooling surfaces of said stator plates and to said spindle bearing facing said working area for acting upon said spindle bearing to counteract penetration of dirt and liquid from said working area into said spindle bearing.

2. Machine tool as defined in claim 1, characterized in that said stator plates extend to an unequal extent in a radial direction with respect to said spindle axis and thereby form cooling surfaces.

3. Machine tool as defined in claim 2, characterized in that different stator plates extend to a different extent in the radial direction.

4. Machine tool as defined in claim 1, characterized in that said stator plates form cooling surfaces arranged on an outer side of said stator facing away from said rotor.

5. Machine tool as defined in claim 2, characterized in that said stator plates form cooling fins extending in the radial direction in relation to said spindle axis.

6. Machine tool as defined in claim 5, characterized in that said cooling fins are formed by successive stator plates extending to a different extent in the radial direction.

7. Machine tool as defined in claim 6, characterized in that said cooling fins are formed by successive stator plates forming sets which extend to a different extent in the radial direction relative to each other.

8. Machine tool as defined in claim 5, characterized in that said cooling fins extend in planes extending transversely to said spindle axis.

9. Machine tool as defined in claim 5, characterized in that cooling channels extending at least partly around said stator lie between said cooling fins.

10. Machine tool as defined in claim 1, characterized in that said cooling device comprises a cooler for said coolant which is fed to said main motor.

11. Machine tool as defined in claim 1, characterized in that said cooling device includes a fan.

12. Machine tool as defined in claim 11, characterized in that said fan is arranged in a frame of said machine tool.

13. Machine tool as defined in claim 1, characterized in that several motor spindles are arranged in a spindle drum which, for its part, is rotatably mounted in a machine frame.

14. A machine tool as defined in claim 1, characterized in that said coolant under pressure above atmospheric acts on all the bearings of said spindle.

15. A machine tool comprising:
a machine frame,
a spindle drum rotatably mounted about an axis in said machine frame,
several motor spindles mounted in said spindle drum, each motor spindle having a work spindle and a main motor, said main motor being integrated into said work spindle coaxially with a spindle axis thereof, said main motor having a rotor and a stator, said stator having stator plates forming, for their part, cooling surfaces, said cooling surfaces forming cooling channels extending in a radial direction of said axis of said spindle drum; and
a cooling device supplying said cooling channels with a flow of gaseous coolant fed in said radial direction to said cooling channels, said gaseous coolant being conducted directly along said cooling channels.

16. Machine tool as defined in claim 15, characterized in that said cooling device comprises a channel leading to an outer circumferential side of said spindle drum and a central channel surrounded by said main motors, and in that said channels, on the one hand, feed said gaseous coolant to said spindle drum and, on the other hand, conduct it away from it.

17. Machine tool as defined in claim 16, characterized in that said channel leading to the outer circumferential side of said spindle drum encloses said outer circumferential side of the latter.

18. Machine tool as defined in claim 16, characterized in that said central channel extends in the direction of said axis of said spindle drum.

19. A machine tool as defined in claim 15, characterized in that said stator plates form cooling fins and that said cooling fins simultaneously serve to support said stators in said spindle drum.

20. A machine tool as defined in claim 15, characterized in that said stator plates form cooling fins and that said stators of said main motors of said motor spindles lie with their cooling fins contiguous with one another in regions thereof.

* * * * *